(12) United States Patent
Nazarov (10) Patent No.: US 8,356,354 B2
(45) Date of Patent: Jan. 15, 2013

(54) SILENT-MODE SIGNATURE TESTING IN ANTI-MALWARE PROCESSING

(75) Inventor: Denis A. Nazarov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 394 days.

(21) Appl. No.: 12/721,308

(22) Filed: Mar. 10, 2010

(65) Prior Publication Data

US 2011/0126286 A1    May 26, 2011

(30) Foreign Application Priority Data

Nov. 23, 2009    (RU) ................................ 2009142888

(51) Int. Cl.
*H04L 29/06* (2006.01)
(52) U.S. Cl. ............ 726/25; 713/187; 713/188; 713/189
(58) Field of Classification Search ...................... 726/25
See application file for complete search history.

(56) References Cited

U.S. PATENT DOCUMENTS

| | | | |
|---|---|---|---|
| 5,452,442 A * | 9/1995 | Kephart .................. | 714/38.1 |
| 6,357,008 B1 * | 3/2002 | Nachenberg .................. | 726/24 |
| 7,185,332 B1 | 2/2007 | Waldin et al. | |
| 7,231,637 B1 | 6/2007 | McEwan | |
| 7,334,005 B2 | 2/2008 | Sobel | |
| 2003/0023865 A1 * | 1/2003 | Cowie et al. ................... | 713/200 |
| 2003/0065926 A1 * | 4/2003 | Schultz et al. ................. | 713/188 |
| 2004/0060044 A1 | 3/2004 | Das et al. | |
| 2004/0158725 A1 * | 8/2004 | Szor ............................. | 713/188 |
| 2005/0268338 A1 * | 12/2005 | Made ............................. | 726/24 |
| 2006/0075504 A1 * | 4/2006 | Liu ................................ | 726/25 |
| 2006/0107321 A1 * | 5/2006 | Tzadikario ...................... | 726/22 |
| 2007/0038677 A1 * | 2/2007 | Reasor et al. ................. | 707/200 |
| 2007/0079377 A1 * | 4/2007 | Pagan ............................. | 726/24 |
| 2007/0079379 A1 * | 4/2007 | Sprosts et al. .................. | 726/24 |
| 2007/0162975 A1 * | 7/2007 | Overton et al. ................. | 726/24 |
| 2007/0180528 A1 * | 8/2007 | Kane ............................... | 726/24 |
| 2010/0083376 A1 * | 4/2010 | Pereira et al. ................... | 726/22 |

OTHER PUBLICATIONS

Shanmugam et al., Risk Mitigation for Cross Site Scripting Attacks Using Signature Based Model on the Server Side, Aug. 2007, Second International Multi-Symposiums on Computer and Computational Sciences, pp. 398-405.*

* cited by examiner

*Primary Examiner* — Taghi Arani
*Assistant Examiner* — Kenneth Chang
(74) *Attorney, Agent, or Firm* — Bardmesser Law Group (57) ABSTRACT

Method and computer program product for signature testing used in anti-malware processing. Silent signatures, after being tested, are not updated into a white list and are sent directly to users instead. If the silent signature coincides with malware signature, a user is not informed. A checksum (e.g., hash value) of a suspected file is sent to a server, where statistics are kept and analyzed. Based on collected false positive statistics of the silent-signature, the silent-signature is either valid or invalid. Use of the silent signatures provides for effective signature testing and reduces response time to new malware-related threats. The silent signature method is used for turning off a signature upon first false positive occurrence. Use of silent signatures allows improving heuristic algorithms for detection of unknown malware.

9 Claims, 10 Drawing Sheets

SILENT-MODE SIGNATURE TESTING IN ANTI-MALWARE PROCESSING

CROSS-REFERENCE TO RELATED APPLICATIONS

This application claims priority to Russian Application No. 2009142888, filed on Nov. 23, 2009, which is incorporated by reference herein in its entirety.

BACKGROUND OF THE INVENTION

1. Field of the Invention

The present invention is related to anti-malware technology, and more particularly, to testing signatures for anti-malware processing.

2. Description of the Related Art

Detection of viruses and malware has been a concern throughout the era of the personal computer. With the growth of communication networks such as the Internet and increasing interchange of data, including the rapid growth in the use of e-mail for communications, the infection of computers through communications or file exchanges is an increasingly significant consideration. Infections take various forms but are typically related to computer viruses, Trojan programs or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail capability. In many instances, attempts to adequately prevent file exchange or e-mail mediated infections significantly inconvenience computer users. Hence, improved strategies for detecting and dealing with virus attacks are desired.

A conventional approach to detecting viruses is signature scanning. Signature scanning systems use sample code patterns extracted from the known malware code and scan for the occurrence of these patterns in other program code. A primary limitation of the signature scanning method is that only known malicious code is detected, that is, only the code that matches the stored sample signatures of the known malicious code is identified as being infected. All viruses or a malicious code previously non-identified, and all viruses or a malicious code created after the latest update of the signature database will not be detected.

In addition, the signature analysis fails to identify the presence of a virus if the signature is not aligned in the code as expected. Alternatively, the authors of a virus may obscure the identity of the virus by an opcode substitution or by inserting dummy or random code into the virus functions. A nonsense code can be inserted that alters the signature of the virus to a sufficient extent so as to become undetectable by a signature scanning program, without diminishing the ability of the virus to propagate and deliver its payload.

Another problem related to use of signatures for malware detection is that the signatures need to be tested. Generating a signature requires a calculation employing a cryptographic algorithm (typically, the MD5 algorithm). Generating a signature using MD5 for a large file is a computational intensive task requiring a lot of system resources. This problem is overcome by using the key parts of the file and calculating a control value (CRC) for producing the file signature.

Figure 1:
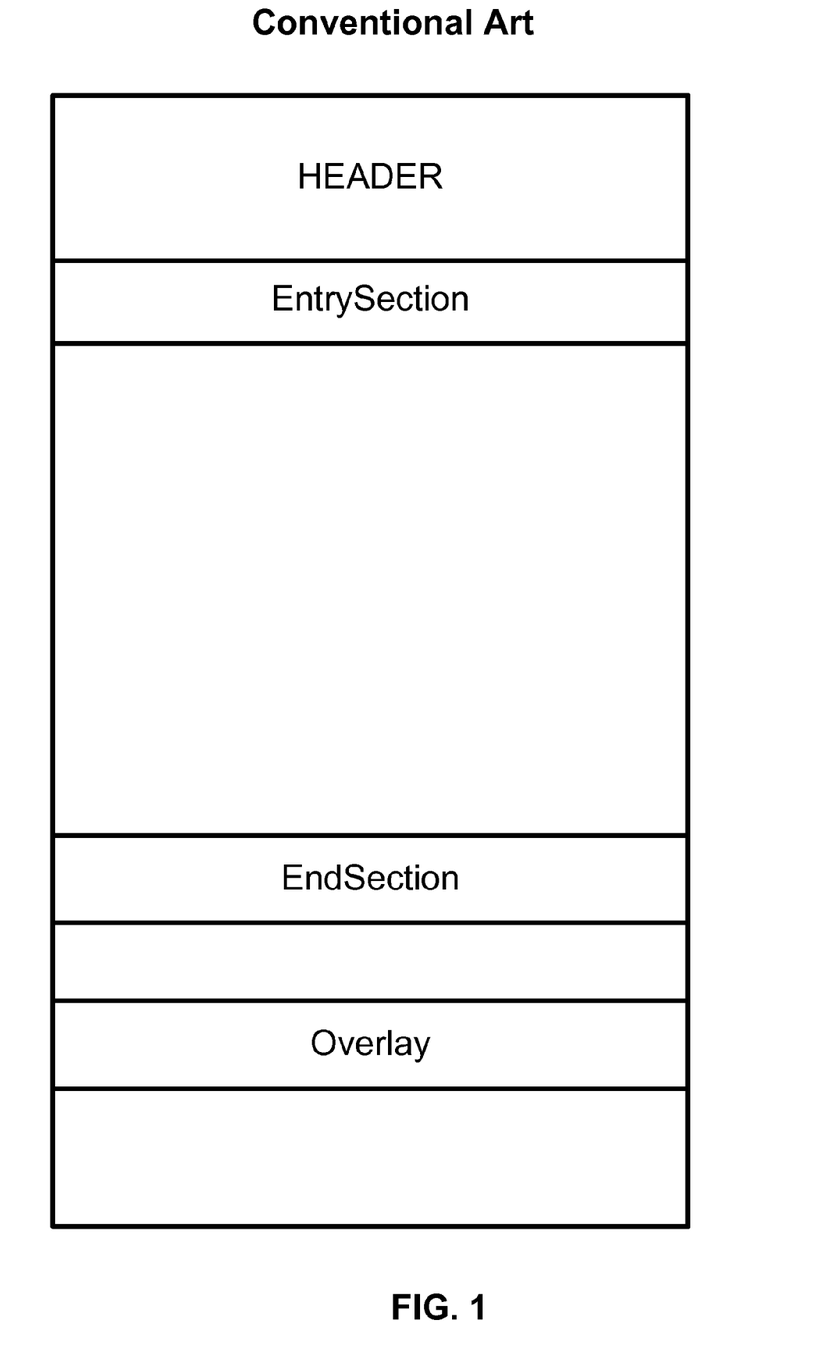
FIG. 1 illustrates a conventional file structure.

The key parts of a file can be a file size, check sum of a file header, check sum of the first and last code sections. A size and a checksum of an overlay of the file can also be used. The file overlay is a data added to the bottom of the file and not described in PE format header. The key portions of a typical file are illustrated in FIG. 1.

Figure 2:
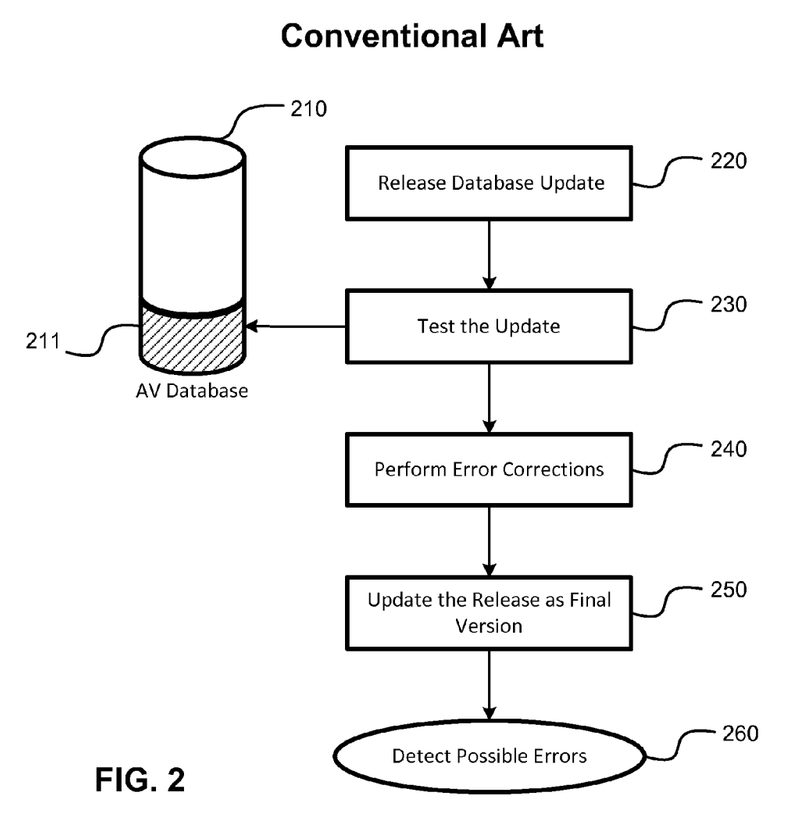
FIG. 2 illustrates a conventional method for AV database update.

A conventional method of using the signatures is depicted in FIG. 2. Updates for AV database 210 are released in step 220. The updates are tested in step 230. Errors are corrected in step 240. Updates are released as a final version in step 250. Possible errors are analyzed in step 260. The process depicted in FIG. 2 takes several hours and requires a lot of resources for testing updates for collisions among terabytes of data produced during the anti-virus (AV) processing. Potentially the amount of data can be on the order of petabytes.

Typically the AV processing is limited in time, since the updates must be released at least hourly. Thus, it is impossible to test the updates against all AV data. Therefore, only the marked portion 211 of the AV database 210 is used for testing purposes. Consequently, even after the errors are corrected and the updates are released, the probability of collisions remains high, especially collisions can occur with applications that are not contained in the AV database 210.

An effective conventional approach of malware detection uses the so-called white lists—the lists of signatures of known "clean" objects. In order to compare a suspect object against the white list, object signatures are generated and used. For efficiency, the white lists have to be constantly updated.

When white lists are used, some false positive determinations are inevitably made. It is important to detect false positives, as they can cause almost as much harm as a malware. For example, a legitimate component can be "recognized" by the AV to be malware, causing severe damage to the reputation of the AV software vendor, and annoyance and wasted time for many users.

Another scenario develops when a malware is mistakenly considered to be a "clean" component and harm a system. Currently, when false positives are detected, signature testing is performed in order to correct white lists and to avoid false positives in the future. However, signature testing is time consuming. By the time the signatures are tested and the white list is updated, some undetected malware can have caused harm on the affected systems.

U.S. Pat. No. 7,231,637 discloses distributing a pre-release scanner updates from the server to the network computers. However, signature testing is not disclosed. U.S. Pat. No. 7,334,005 also discusses providing security updates to users, but it does not use signatures.

It is apparent that improved techniques for testing signatures are desired. Accordingly, there is a need in the art for a method that addresses the need for providing the signatures to users for effective anti-malware processing.

SUMMARY OF THE INVENTION

The present invention is intended as a method for testing signatures used in anti-malware processing that substantially obviates one or several of the disadvantages of the related art.

In one aspect of the invention there is provided a method and computer program product for silent-signature testing used in anti-malware applications. According to an exemplary embodiment, silent-signatures, after being tested, are not updated into a black list (e.g., a database of signatures of malware objects) and are sent directly to users instead. The silent-signatures work different from the regular signatures. If the silent signature coincides with a malware signature, a user is not informed. A checksum (e.g., MD5 hash value) of a suspected file is sent to a server, where statistics are kept and analyzed. Based on collected statistics of silent-signature false positive matches, the silent-signatures are deemed either valid or invalid.

According to the exemplary embodiment, the use of the silent signatures provides for effective signature testing and reduces the response time to new malware-related threats. This also frees up AV resources for other tasks, such as, for calculation and analyzing user statistics.

The silent signature method can be used for turning off a signature upon the first false positive occurrence. Use of silent signatures allows improving heuristic algorithms for detection of unknown malware. The silent signatures can be used in filtering for unknown malware components as well as in parental control applications.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide a further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, there is provided a method, system and computer program product for signature testing to be used in anti-malware applications. According to the exemplary embodiment, silent-signatures, after being tested, are not updated into a white or a black list, and are sent directly to users instead. The silent signatures are used differently from the regular signatures.

If the silent-signature coincides with a malware signature, a user is not informed. A checksum (e.g., hash value) of a suspected file is sent to a server, where statistics are kept and analyzed. Based on the collected statistics of silent-signature matches, the silent-signatures are either valid or invalid. Note that any other hashing algorithm, such as MD4, SHA1, SHA2, SHA256, etc. can be used for generating the signatures.

According to the exemplary embodiment, use of the silent signatures provides for an effective signature testing and reducing the response time to new malware-related threats. This also frees up AV resources for other anti-malware processing tasks.

Figure 3:
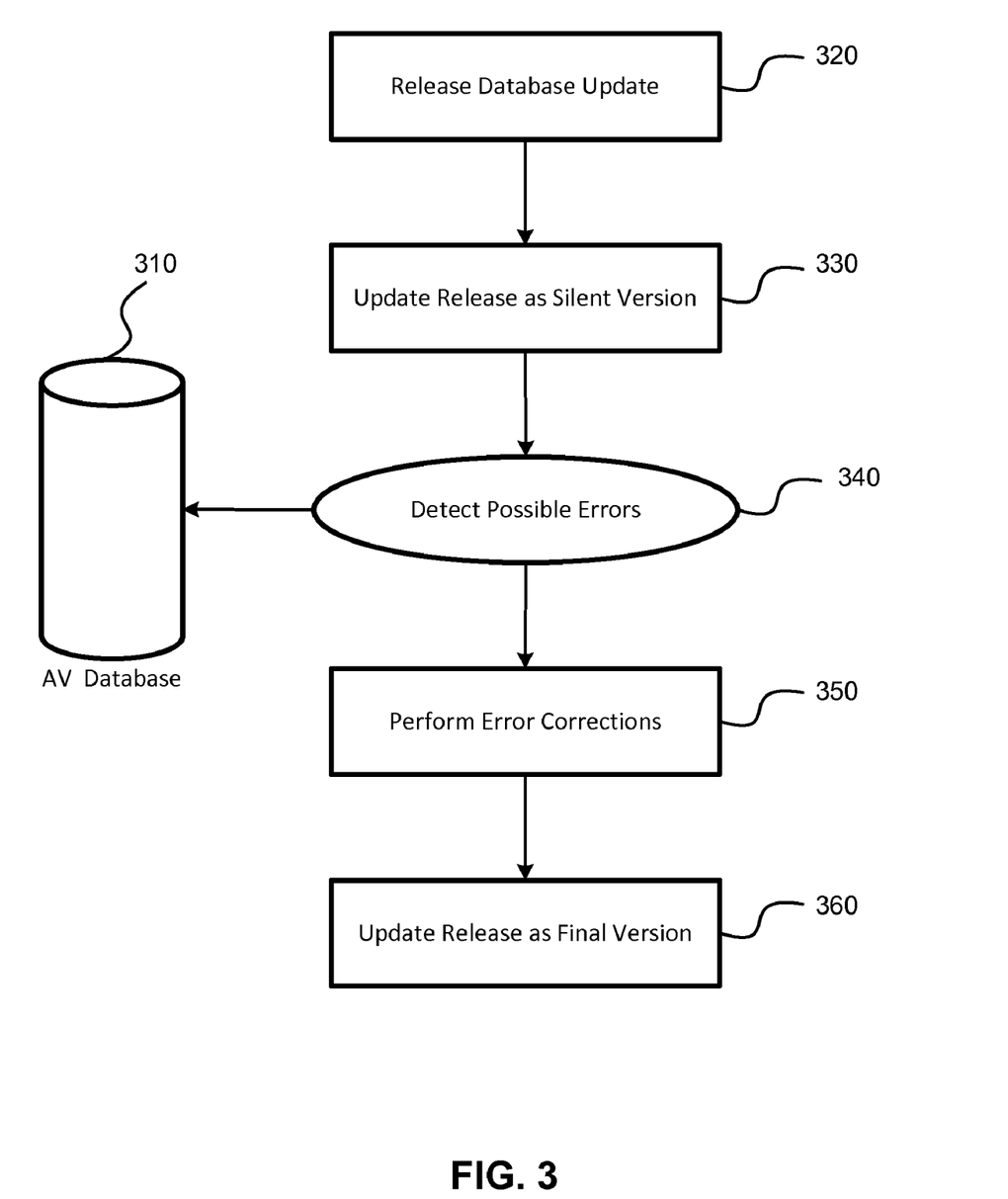
FIG. 3 illustrates a method for silent mode AV database updates, in accordance with the exemplary embodiment.

A method in accordance with the exemplary embodiment is depicted in FIG. 3. It overcomes the shortcomings of the conventional method depicted in FIG. 2. Possible errors and collisions are avoided by release of the silent updates. Updates for AV database 310 are released in step 320. The updates are released as silent version in step 330. Possible errors are detected in step 340. The errors are corrected in step 350. Then, the update for database 310 is released as a final version in step 360.

During the process described above, statistics of collisions of updated database records can be collected. For example, if an update being tested in a silent mode collides with a hash value of a "clean" file from the AV database, then a false positive is detected. Thus, corrections are made and the test update is switched off. However, if during a pre-defined test period no errors are triggered, the silently tested updates can be released as a final version.

Figure 4:
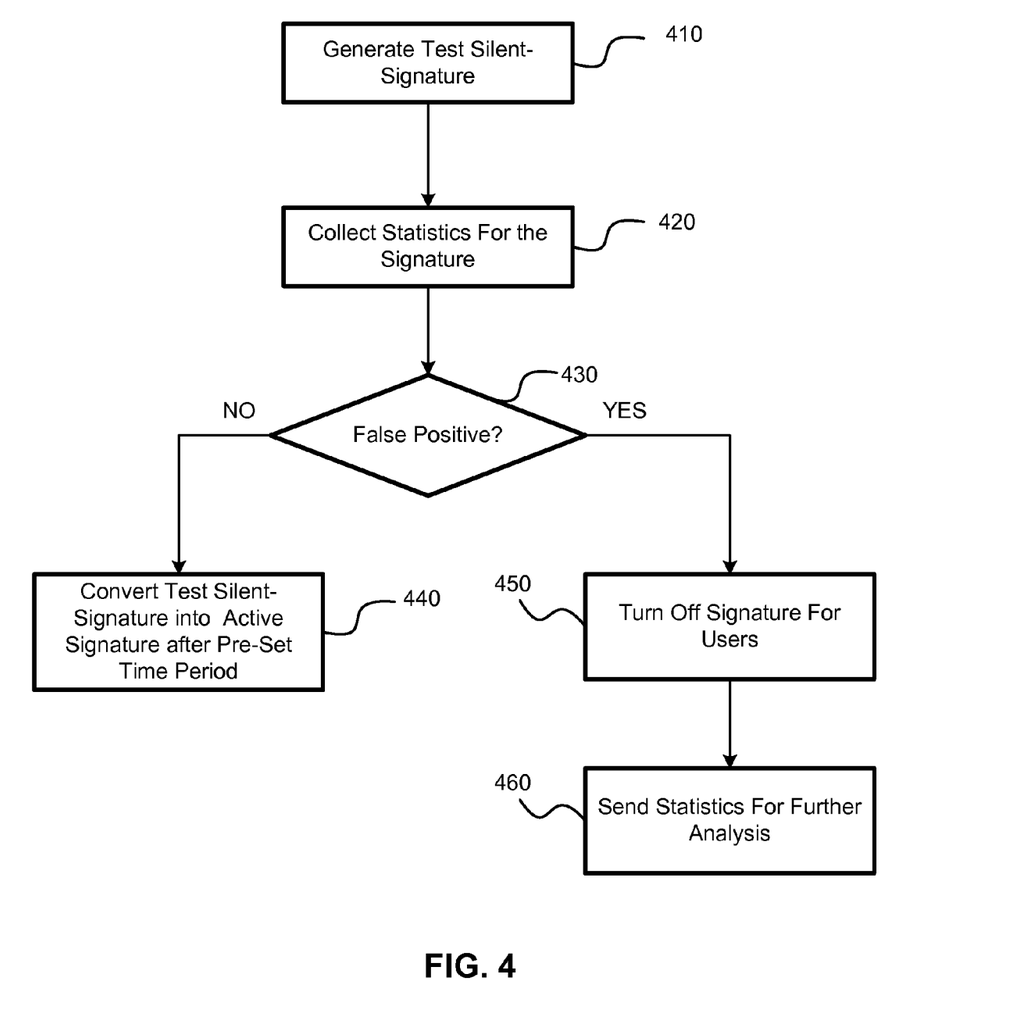
FIG. 4 illustrates a method of using a test silent-signature, in accordance with the exemplary embodiment.

In one exemplary embodiment, test silent-signatures are used for correcting the lists of "clean" objects (i.e., white lists containing clean object signatures). FIG. 4 illustrates a method of using a test silent-signature, in accordance with the exemplary embodiment. A test silent-signature is generated in step 410. Statistics for this signature are collected in step 420.

The statistics include all instances when the test silent-signature coincides with the signature of other objects. In step 430, the statistics are analyzed for false positives (i.e., situations where a test signature coincides with a signature from the white list). If a false positive is detected in step 430, the test signature is turned off for users in step 450. In other words, this signature is blocked and is not available on user computers. Then, statistics for this signature are sent for further analysis in step 460.

If no false positives are detected in step 430, the test silent-signature is converted into an active signature after a pre-set time period in step 440. In other word, the signature is deemed valid and can be used in the black list (e.g., a list of signatures of known malware objects).

Figure 5:
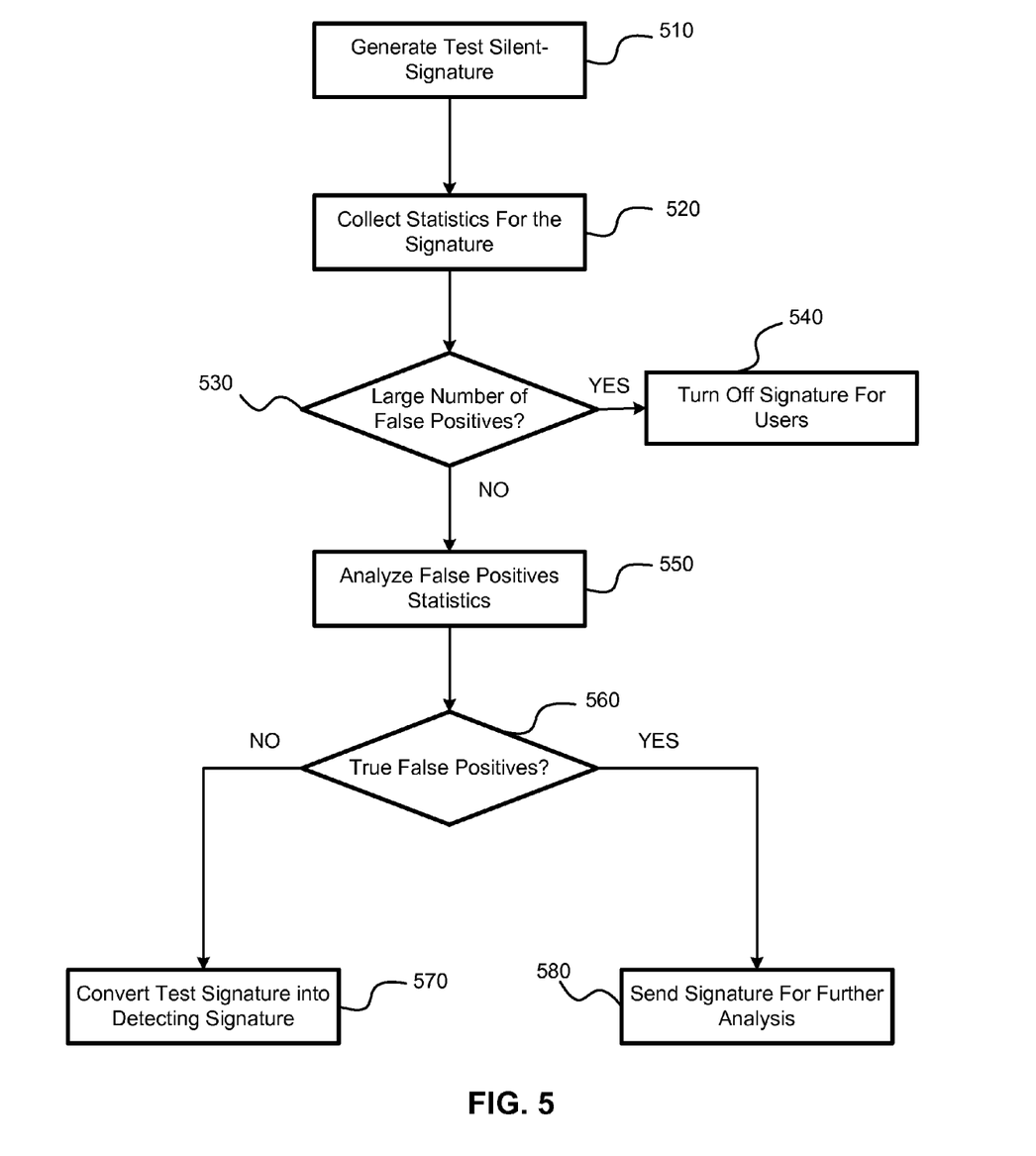
FIG. 5 illustrates a method for using a test silent-signature, in accordance with the exemplary embodiment.

In another exemplary embodiment, a method of using silent test signatures can be employed with a more comprehensive analysis of false positives statistics. FIG. 5 illustrates a method for using a test silent-signature, in accordance with the exemplary embodiment. A test silent-signature is generated in step 510. Statistics for this signature are collected in step 520.

The statistics include all instances when the test silent-signature coincides with signature of other objects. In step 530, the statistics are analyzed for false positives (i.e., situations where a test signature coincides with a signature from the white list). If a large number of false positives are detected in step 530, the test signature is turned off for users in step 540. In other words, this signature is blocked and is not available on user computers. If, in step 530, only a few false positives are detected, the statistics of these false positives are analyzed in step 550.

In step 560, it is determined if the false positives are true (i.e., the test signature coincided with a signatures of a clean object from a white list) or an error in false positive determination was made in step 530 (i.e., the test signature coincided with a malware signature from the black list). If the false positives are determined to be true, in step 560, the test silent-signature is sent for further analysis in step 580.

If the false positives determinations are made in error (in other words, the "false positive" is not false but an actual positive) or no false positives was detected, the test silent-signature is converted into a detecting signature in step 570. The tested signature can be then added to a black list or provided to user AV modules. Note that in step 530 a pre-set value for number of false positives can be used.

According to the exemplary embodiment, heuristic algorithms for detecting unknown malware components can be improved. Heuristics reflect behavior patterns of an executable component. A behavior pattern of a known malware component can be compared against a behavior pattern of a suspect component to determine if it is malware. Heuristic data can be used in addition to signatures, since it provides for more comprehensive analysis of potential malware. The signatures have to coincide, while the behavior patterns can be similar in order to detect malicious actions performed by an executable component.

Figure 6:
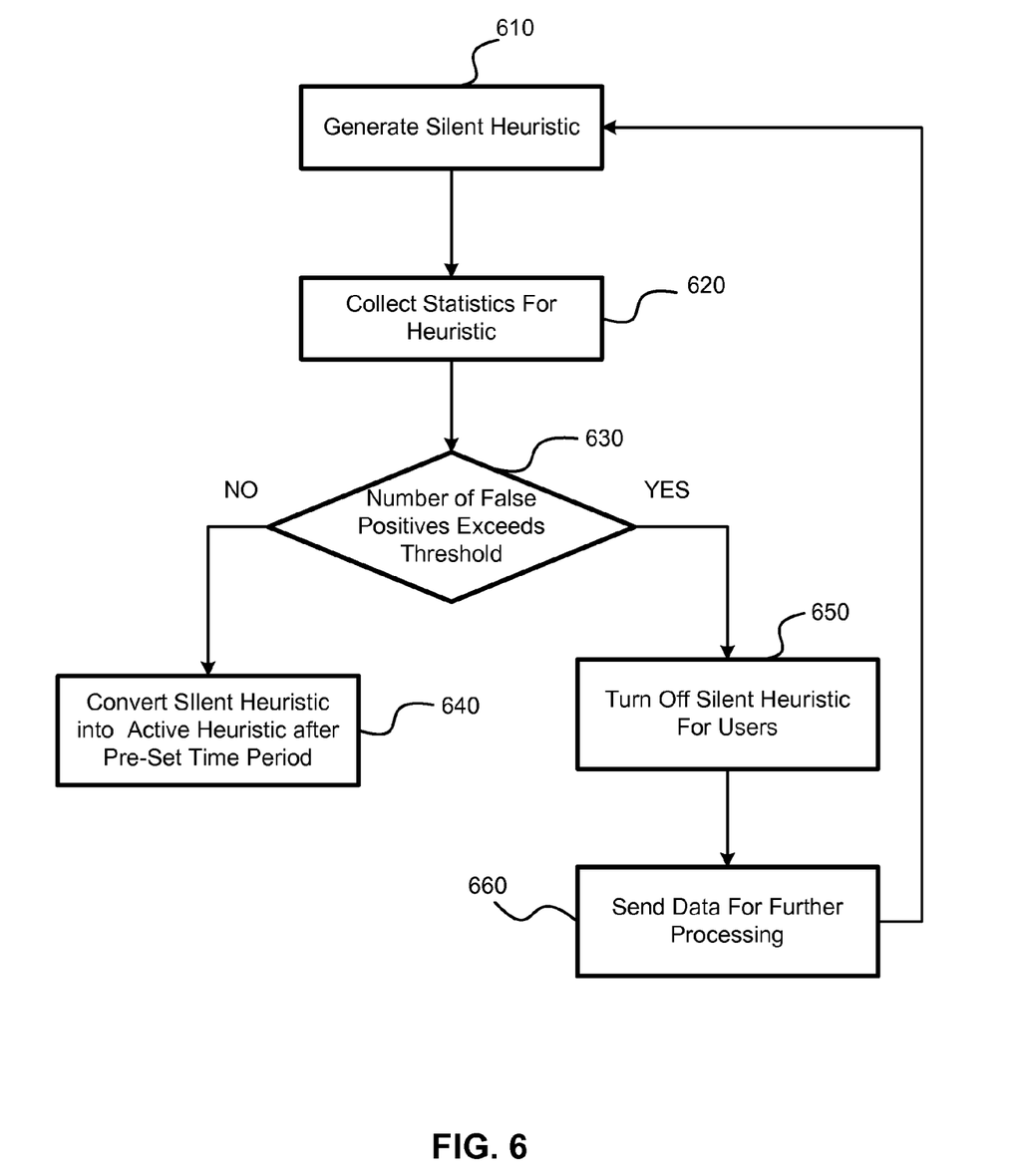
FIG. 6 illustrates a method for improving heuristic algorithms for detecting unknown malware components, in accordance with the exemplary embodiment.

FIG. 6 illustrates a method for improving heuristic algorithms for detecting unknown malware components, in accordance with the exemplary embodiment. A test silent-heuristic is generated in step 610. Statistics for this silent-heuristic are collected in step 620.

The statistics include all the instances when the test silent-heuristic (i.e., object's behavior pattern) coincides with the heuristics of other objects. In step 630, the statistics are analyzed for false positives (i.e., situations where a test heuristic coincides with a heuristic of a clean object).

If a number of detected false positives, collected in step 620, exceeds a threshold in step 630, the silent-heuristic is turned off for users in step 650. In other words, this silent-heuristic is blocked and is not available on user computers. Then, in step 660, the heuristic data is sent for further processing. If, in step 630, a number of the false positives are less than a threshold, after a pre-set time period, the silent-heuristic is converted into an active heuristic in step 640. Then, this heuristic can be accurately used for detecting behavior of known and unknown malware objects, as well in detection of SPAM.

Figure 7:
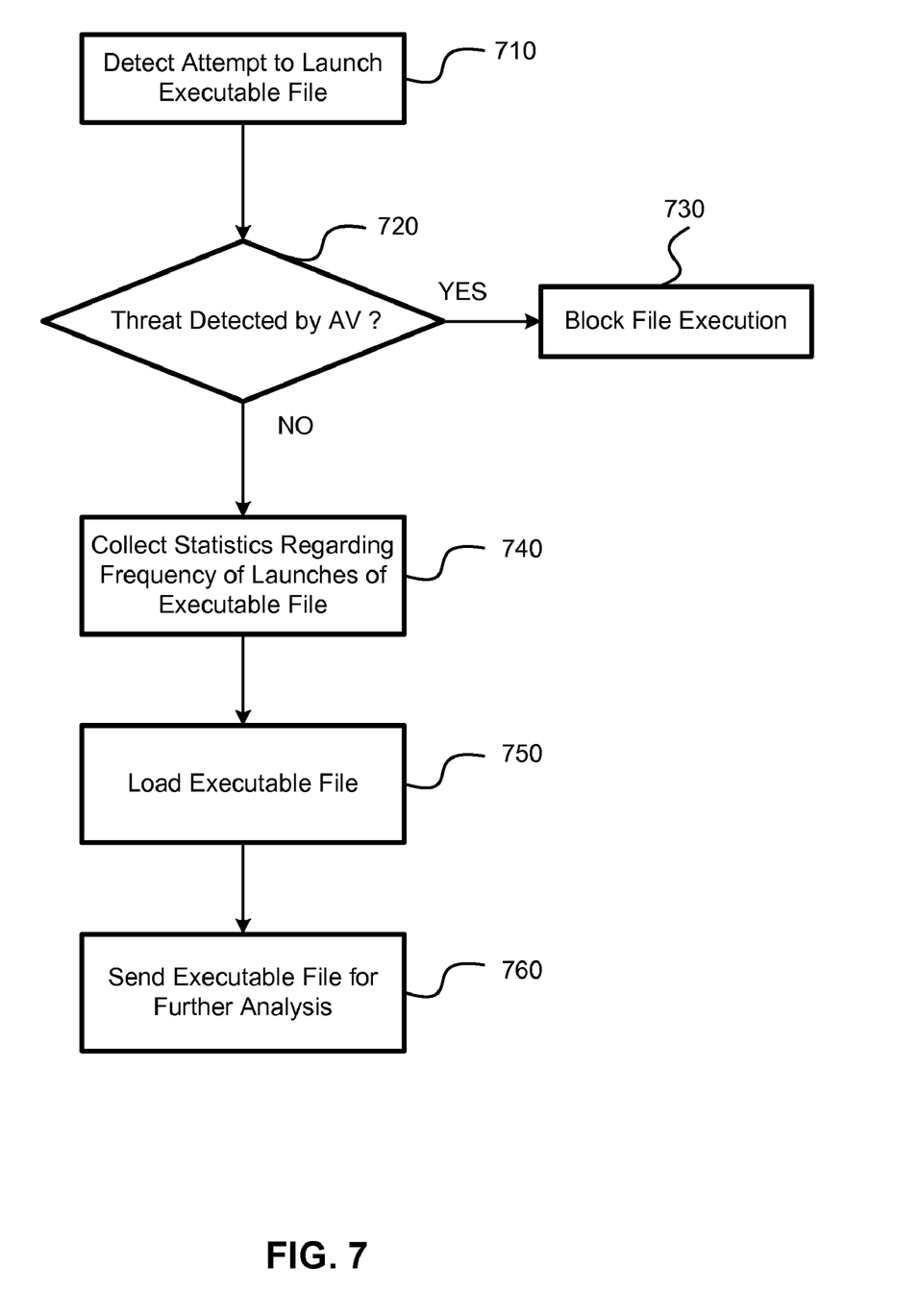
FIG. 7 illustrates a method for file filtering, in accordance with the exemplary embodiment.

In another exemplary embodiment, the statistic analysis performed in a silent mode can be used for filtering unknown executable files. FIG. 7 illustrates a method for file filtering in accordance with the exemplary embodiment. An attempt to launch an executable file is detected in step 710. If, in step 720, a malware threat is detected, execution of the file is blocked in step 730.

If no threat is detected in step 720, statistics regarding the executable file and the frequency of launches of the executable file are collected in step 740. Then, in step 750, the file is downloaded and sent for a further analysis in step 760. After the analysis, either a white list or black list can be updated with a signature of this executable file.

Figure 8:
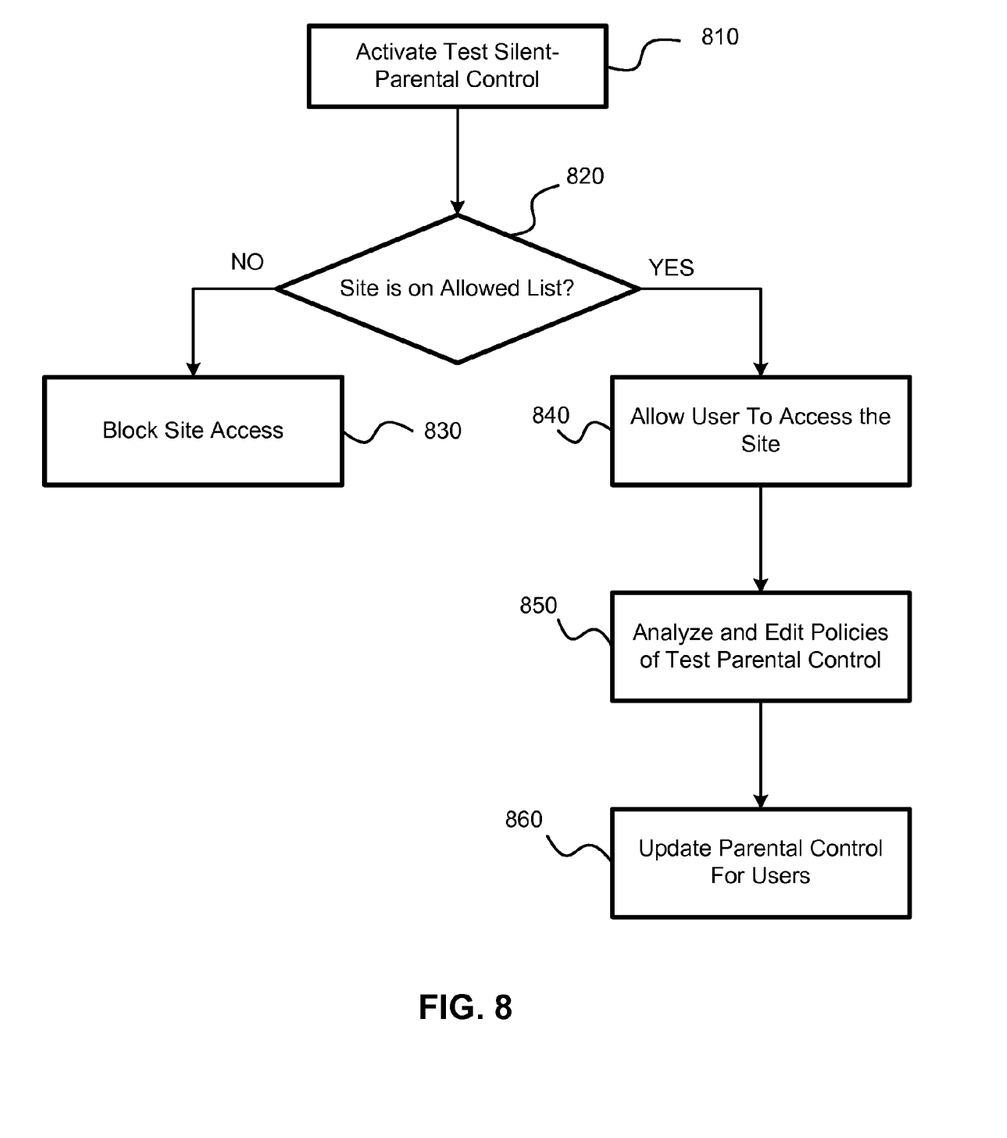
FIG. 8 illustrates a method for parental control, in accordance with the exemplary embodiment.

Collection of the statistics in the silent mode can be used, for example, for enhanced parental control of computer systems. FIG. 8 illustrates a method for parental control, in accordance with the exemplary embodiment. The approach depicted in FIG. 8 is similar to the one used for enhance heuristic malware detection depicted in FIG. 6. Test Silent-Parental Control module is activated in step 810. In step 820, it is determined if a site attempted to be accessed is on an allowed list.

If the site is not on the allowed list, the site access is blocked in step 830. If the site is present on the allowed list, the site access is allowed in step 840. Then, in step 850, policies of the Silent-Parental Control module are analyzed and edited and Parental Controls are updated for users in step 860.

Figure 9:
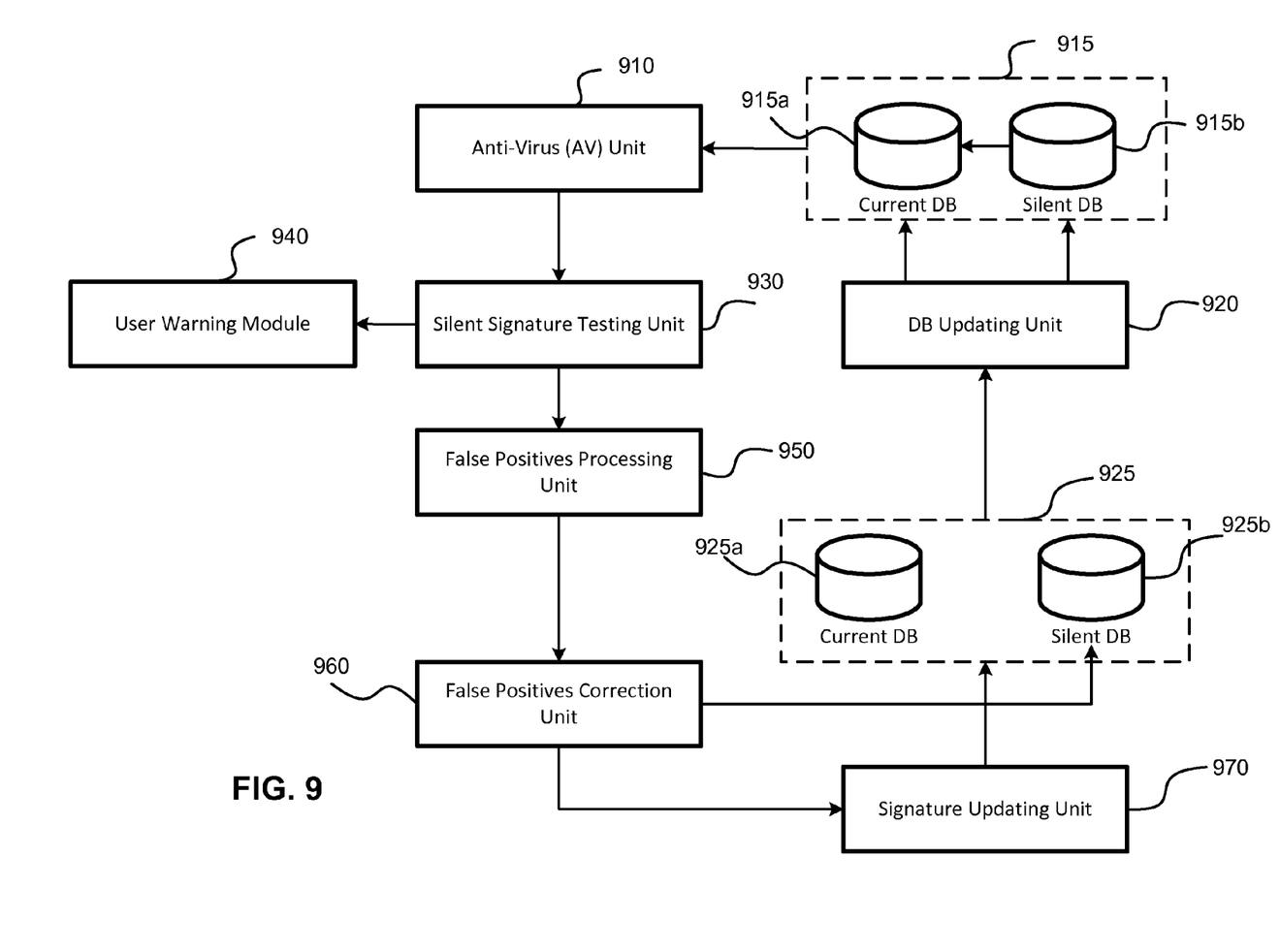
FIG. 9 illustrates a system, in accordance with the exemplary embodiment.

The system, in accordance with the exemplary embodiment, comprises a signature updating unit 970 that updates signatures, heuristic data, parental control data, etc. The updates can be in the form of the already tested updates 925a (Current DB) or silent test updates 925b (Silent DB) that are being tested by a user. The updates are provided to a DB updating unit 920. Anti-virus module 910 has its own databases 915 comprising current DB 915a (Current DB) and Silent DB 915b.

If the AV unit 910 has detected a potential threat, the type of DB records is determined in testing unit 930. If records that triggered the AV unit 910 are current records 915a, the signature testing unit provides specific information to a user warning module 940. If it is determined that the records are silent updates 915b, the user is not notified and a false positives processing unit 950 will check the even for false positives.

If a false positive is confirmed, it is sent to a false positives correction unit 960 that provides required correctional data to the silent DB 925b. This data is also sent to a signature updating unit 970 for correcting the databases 925. Note that the current DB 915a can be updated by using corrected records from silent DB 915b.

Note that the exemplary embodiment also can be advantageously used for testing lists of phishing sites, detection of network attacks, banner testing, etc. Those skilled in the art will appreciate that the exemplary embodiment provides for effective silent-signature testing and reducing response time to new malware-related threats, which, in turn, frees up AV resources for other anti-malware processing tasks.

Figure 10:
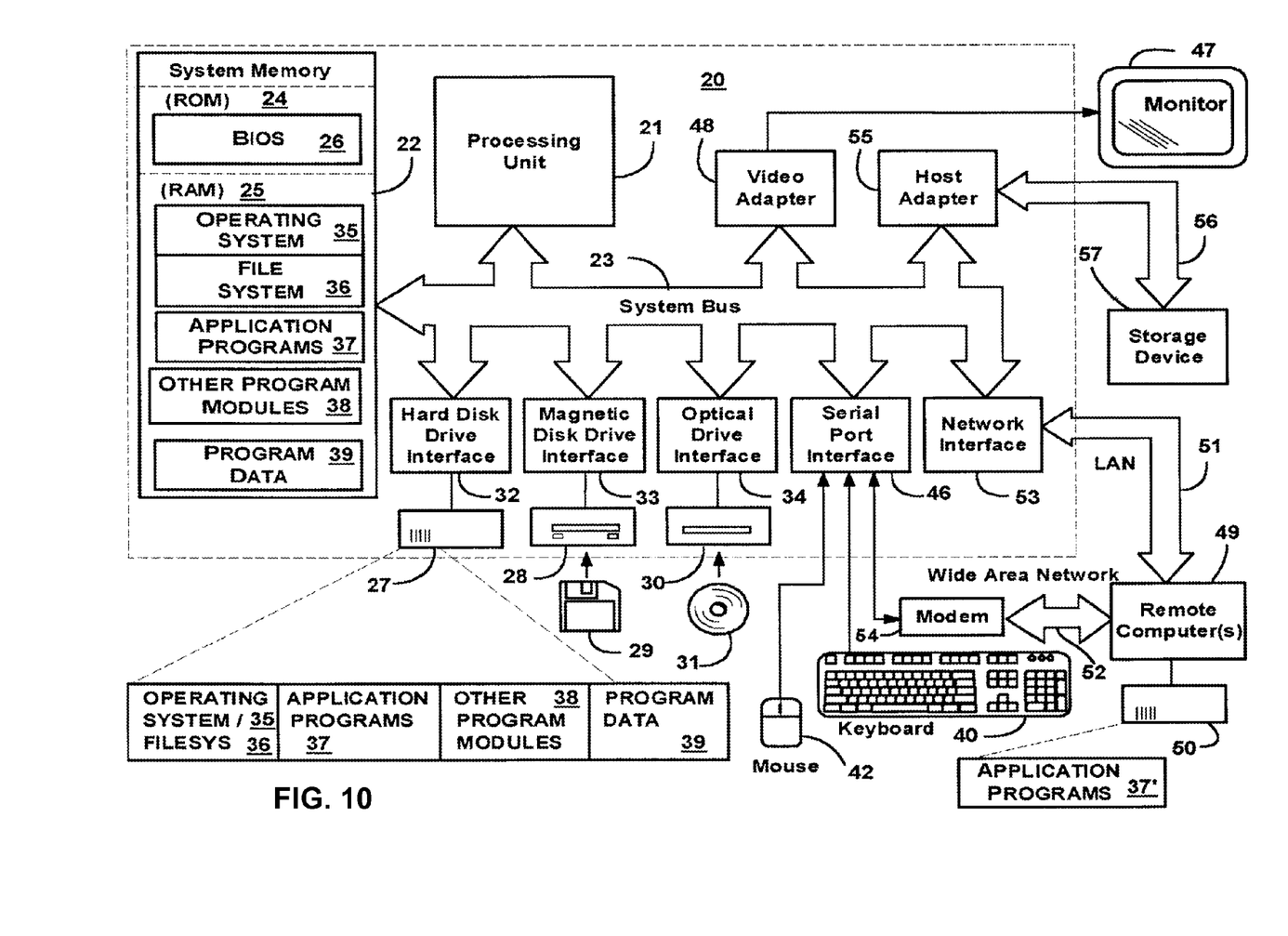
FIG. 10 illustrates a schematic of an exemplary computer system on which the invention can be implemented.

With reference to FIG. 10, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between the elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and associated computer-readable media provide a non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 coupled to the system bus, and may be connected by other interfaces, such as a parallel port, game port or universal serial bus (USB). A monitor 47 or other type of display device can be also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the computer 20, or portions thereof, may be stored in the remote memory storage device. It will be appreciated that the network connections shown are exemplary and other means of establishing a communications link between the computers may be used as well.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A silent-mode method for protecting against malware and correcting a white list, the method being performed on a client computer having a processor and a memory, the method comprising:
    (a) creating a white list of clean objects and a black list of malicious objects;
    (b) generating a silent-signature, the silent-signature being applied on the client computer without informing a user of the client computer of a match with signatures of the objects from the white list and the black list;
    (c) collecting statistics for the silent-signature;
    (d) analyzing the silent-signature statistics for false positive occurrences;
    (e) turning off the silent-signature on the client computer and sending the silent-signature statistics from the client computer to a server for further analysis, if at least one false positive occurrence is detected;
    (f) converting the silent-signature into an active signature and subsequently utilizing the silent-signature for malicious object identification and informing the user of the malicious object identification on the client computer, if no false positive occurrence is detected;
    (g) adding the active signature to the black list on the client computer; and
    (h) updating the white list,
        wherein the false positives occur when the silent-signature matches a signature from the white list.

2. The method of claim 1, wherein the silent-signature is converted into the active signature after a pre-set time interval.

3. A silent-mode method for generating a detecting signature, the method being performed on a client computer having a processor and a memory, the method comprising:
    (a) creating a white list of clean objects and a black list of malicious objects;
    (b) generating a test silent-signature, the test silent-signature being applied on the client computer without informing a user of the client computer of a match with signatures of the objects from the white list and the black list;
    (c) collecting statistics on the client computer for the test silent-signature;
    (d) analyzing the test silent-signature statistics for false positive occurrences;
    (e) turning off the test silent-signature on the client computer, if a number of false positive occurrences exceeds a threshold;
    (f) analyzing the false positive statistics, if the number of false positive occurrences is below the threshold;
    (g) converting the test silent-signature into a detecting signature and subsequently utilizing the detecting signature for malicious object identification and informing the user of the malicious object identification on the client computer, if false positives are not confirmed; and
    (h) sending the test silent-signature from the client computer to a server for further analysis, if the false positives are confirmed,
        wherein false positives confirmed constitute coincidence between the test silent-signature and a clean object's signature from the white list.

4. The method of claim 3, further comprising adding the detecting signature to the black list.

5. The method of claim 3, wherein the test silent-signature is converted into the detecting signature after a pre-set time interval.

6. The method of claim 3, wherein the test silent-signature reflects silent-heuristic data comprising behavior patterns of an executable component.

7. The method of claim 6, wherein the silent-heuristic data is converted into an active heuristic data that is used for malware detection on user sites.

8. A silent-mode method for filtering executable files, the method being performed on a client computer having a processor and a memory, the method comprising:
(a) creating a white list of clean objects and a black list of malicious objects;
(b) detecting an attempt to launch an executable file on the client computer;
(c) blocking execution of the file, if a malware threat is detected;
(d) on the client computer, collecting statistics regarding frequency of launches of the executable file, if no malware threat is detected;
(e) loading the executable file;
(f) generating a silent-signature of the executable file, the silent-signature being applied to detect malware without informing a user of the client computer of a match with signatures of the objects from the white list and the black list;
(g) sending the executable file for further analysis; and
(h) adding the silent-signature to the white list or to the black list based on analysis of the executable file and subsequently utilizing the silent-signature for malicious object identification and informing the user of the malicious object identification on the client computer,
wherein silent-signature use statistics are analyzed for false positive occurrences, and the silent-signature is turned off on the client computer, if a number of false positive occurrences exceeds a threshold,
if the number of false positive occurrences is below a threshold, the silent-signature is converted into a detecting signature and subsequently used for malicious object identification and for informing the user, and
wherein the false positives occur when the silent-signature matches a signature from the white list.

9. A system for anti-malware processing by using a detecting signature, the system comprising:
a server, wherein the server generates a test silent-signature, the test silent-signature being applied on client computers without informing a user of matches with signatures of objects from a white list and a black list;
a plurality of client computers connected to the server;
a database accessible by the server containing signatures of clean objects;
a database accessible by the server containing signatures of malicious objects;
a statistics module coupled to the server for collecting statistics from the client computers for the test silent-signature, wherein:
the server analyzes the test silent-signature statistics for false positive occurrences;
turns off the test silent-signature for users of the client computers, if a number of false positive occurrences exceeds a threshold;
analyzes the false positive statistics, if the number of false positive occurrences is below the threshold;
converts the test silent-signature into a detecting signature and provides it to the client computers for subsequently utilizing the detecting signature for malicious object identification and informing the user of the malicious object identification on the client computer, if false positives are not confirmed; and
receives the test silent-signature from the client computer for further analysis, if the false positives are confirmed,
wherein the false positives occur when the test silent-signature matches a signature from the white list.

* * * * *